United States Patent [19]

Georgel et al.

[11] Patent Number: 4,477,241
[45] Date of Patent: Oct. 16, 1984

[54] APPARATUS FOR MOLDING CURD FOR THE MANUFACTURE OF CHEESES OF SMALL SIZE

[75] Inventors: Gaston P. V. Georgel, Evron; Marcel A. R. Guyonnet, Chaville, both of France

[73] Assignee: Fromageries Bel-La Vache Qui Rit, Paris, France

[21] Appl. No.: 86,062

[22] Filed: Oct. 18, 1979

[51] Int. Cl.³ .......................... B29D 7/18; B29C 1/00
[52] U.S. Cl. ..................................... 425/85; 99/458; 99/465; 425/297; 425/302.1; 425/398
[58] Field of Search ................. 99/458, 459, 460, 465; 425/85, 296, 297, 302.1, 398

[56] References Cited

U.S. PATENT DOCUMENTS

| | | | |
|---|---|---|---|
| 3,468,026 | 9/1969 | Robertson et al. | 425/85 |
| 4,137,836 | 2/1979 | Megard | 99/456 |
| 4,244,286 | 1/1981 | Rust | 99/456 |
| 4,332,831 | 6/1982 | Rust | 99/459 |

Primary Examiner—Willard E. Hoag
Attorney, Agent, or Firm—Kuhn, Muller and Bazerman

[57] ABSTRACT

Apparatus for molding curd in calibrated portions, a mixture of curds and whey, introduced into a hopper, fills perforated tubes in which the whey is separated from the curd and becomes compact. A plate closing off the base of the tubes retracts periodically and the curd drops abruptly by a predetermined height onto a subjacent plate, which is sliced by the first plate returning to its original position. The slices of curd are then transferred into one of the molds with a plurality of cells. This is applicable to the manufacture of cheeses of small size.

6 Claims, 8 Drawing Figures

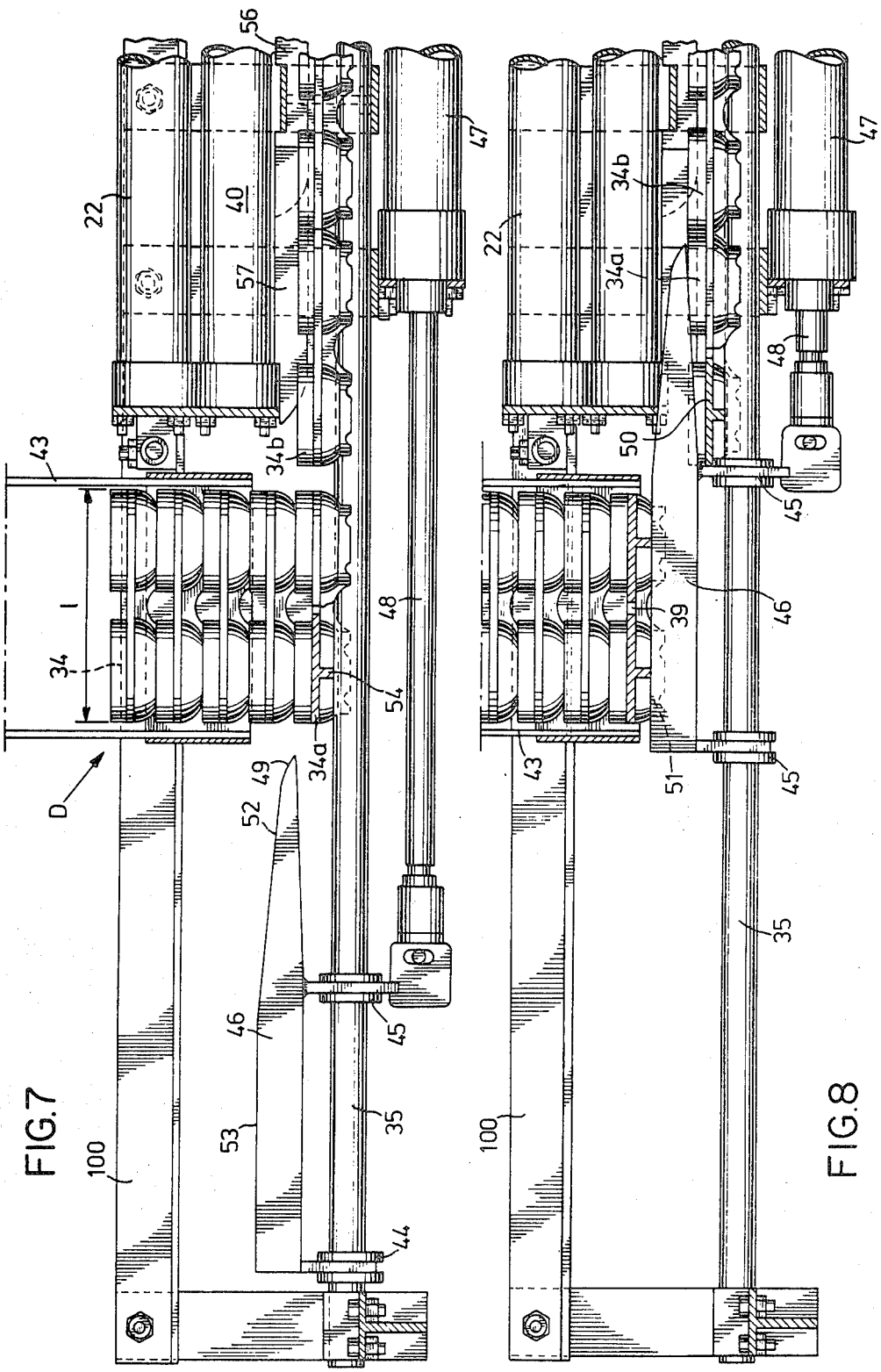

APPARATUS FOR MOLDING CURD FOR THE MANUFACTURE OF CHEESES OF SMALL SIZE

BACKGROUND OF THE INVENTION

The invention relates to the manufacture of small-sized cheeses from portions of milk curd obtained by separation of the whey from a mixture of curds and whey, and molding in a suitable form.

Methods which produce portions of curd by use of perforated tubes which are loaded with the curd-and-whey mixture through the walls of which the whey escapes are known. In these processes the agglomerated curd is made to slide gradually downward with the aid of a piston. When a suitable quantity of the column of curd thus formed in each tube emerges at the base thereof, it is cut. The portion of curd, calibrated in width and thickness thus obtained, is introduced into a mold.

Such a method, which is generally applied in a rotary machine in which the perforated tubes are disposed in a circle, along the generatrices of a cylinder, has the drawback that the curd, agglomerating as it gradually descends in the perforated tubes, has a tendency to clog the pores of the tubes so that the separation of the whey is hampered, and malfunctions occur.

The present invention is a new method which eliminates this drawback.

BRIEF DESCRIPTION OF THE INVENTION

The method according to the invention consists in agglomerating the curd in a compact column in a fixed, vertical perforated tube, and periodically abruptly dropping the column of curd thus formed, by a predetermined height. The portion of the column then emerging from the bottom of the tube is cut, and the slice of curd thus obtained is placed in a mold. This slice of curd is calibrated in width and thickness as in the known method. However, the slices of curd are not produced by slicing the bottom portion of a column of curd gradually sliding and emerging at the base of a perforated tube. On the contrary, in the method according to the present invention, the portion of curd to be cut appears periodically, due to the abrupt drop of the entire column of curd, which is accompanied by a hammering and a shock wave, which has the effect of preventing the clogging of a perforated tube, or of eliminating the start of clogging. The result, then, is a dependable and regular operation with no malfunctions causing downtime of the apparatus.

The invention is also a device for carrying out the method described above. This device comprises, essentially, a station for formation, by continuous agglomeration and expulsion of the whey from at least one column of curd in at least one fixed, vertical, perforated tube, surmounted by a hopper feeding the mixture of curd and whey into the tube, and, below, a station for slicing the curd, having a member that closes the lower outlet of the perforated tube, this member periodically retracting, so that, each time, the column of curd in the perforated tube drops abruptly by a predetermined height onto a subjacent stop member, the corresponding portion of curd is cut, and introduced into a mold.

Advantageously, each section of curd thus obtained by slicing the column of curd is not placed directly in the mold, but is carried to a transfer station placed adjacent the slicing station, where it is introduced into the mold. This makes it possible to complete, under optimal conditions, the operations of cutting and transfer into the mold. For this purpose, preferably, the lower portion of the column of curd in the perforated tube passes through a movable ring which, after this portion is cut, conveys it to the transfer station where a mold, brought into alignment with the ring, receives the slice of curd under the positive action of a plunger which causes it to descend from the ring into the mold.

In an advantageous form of execution, the slicing station comprises three superposed horizontal plates, each being animated with a proper alternating movement of translation in its own plane. A first plate which, successively, closes the lower outlet of the perforated tube, retracts, then returns to cut the portion of the column emerging from the tube. The emerging whey and curds rests on a second plate, which constitutes a stop means. The column of curds passes through an open ring which is fixed in a third plate which is positioned between the first and second plate. The movement of the third plate accompanied by the second plate, conveys the slice of curd to the transfer station, where the second plate retracts, to permit the transfer of the said slice into the mold.

The mold receiving the slice of curd is positioned in the transfer station. When the mold is loaded, it is directed toward the outlet of the device and removed. A series of molds is preferably provided, which advance step by step on guide rails through the transfer station. With a pause in the advancement, a mold lies in vertical alignment with the ring containing curd, stopped in the transfer station. This mold is lifted from the rails and brought to the vicinity of the lower edge of the ring, the slice of curd transferred to the mold and the mold returned to the rails where it again participates in the step-by-step advancement of the series of molds, until it is removed from the apparatus by the very fact of this advancement.

The molds can be supplied by a distribution station that places them automatically, from a feeder housing containing a stack of molds successively on the guide rails, and causes them to advance thereon step by step. Preferably, the distribution station comprises a pair of pointed blades, animated with an alternating movement parallel with the rails, which introduce themselves between a lower mold, resting on the rails, and the other molds stacked in the housing, and sustain the latter while releasing the lower mold. The distribution station has slides, solid with the blades, which push the molds in the direction of the transfer station, and with it, all the molds already placed in succession on the rails. The blades and the slides then return to their original position, so that the stack of molds from the housing falls back on the rails and the next cycle can begin.

The device according to the invention can consist, not only of a single perforated tube, but a group of perforated tubes, forming many columns of curd, whose lower portions are simultaneously released and cut, and each time provide a group of slices of curd filling a group of rings which are transferred by a group of plungers into a single mold with a group of separate cells, each of which receives a slice of curd. Naturally, the geometric arrangement (seen in projection on a horizontal plane) of the groups of perforated tubes, rings, plungers and moldings cells is identical.

The device can operate entirely automatically, the movements of the various moving parts being coordinated in time and in amplitude in such a way that these members perform their action at the proper moment in each working cycle, and insure the necessary coincidences in the phases of stoppage of the movement of the transportation and transfer members (in particular of the rings, the plungers and the molds).

To improve the agglomeration of the curd, and the separation of the whey in the station forming the curd into a compact column, it is recommended, according to the invention, to surround the perforated tube, or the group of perforated tubes with a leakproof enclosure. The interior of the enclosure is divided into two parts by a horizontal partition, the enclosure being equipped in each of these parts with a whey evacuation tube. In this way, the whey escaping from the mixture of curd and whey in the upper region, is prevented from reaching the lower region and there interfering with the agglomeration of the curd into a compact mass.

The following description, in reference to the drawings attached by way of non-limiting examples, will make it possible to understand how the invention is applied in practice.

BRIEF DESCRIPTION OF THE DRAWINGS

FIGS. 7 and 8 represent, in the manner of FIG. 1 but on the scale of FIGS. 3 to 6, the distribution station of the molds, situated above the stations of formation and slicing of the curd, respectively in two operating positions.

DETAILED DESCRIPTION OF THE INVENTION

Figure 1:
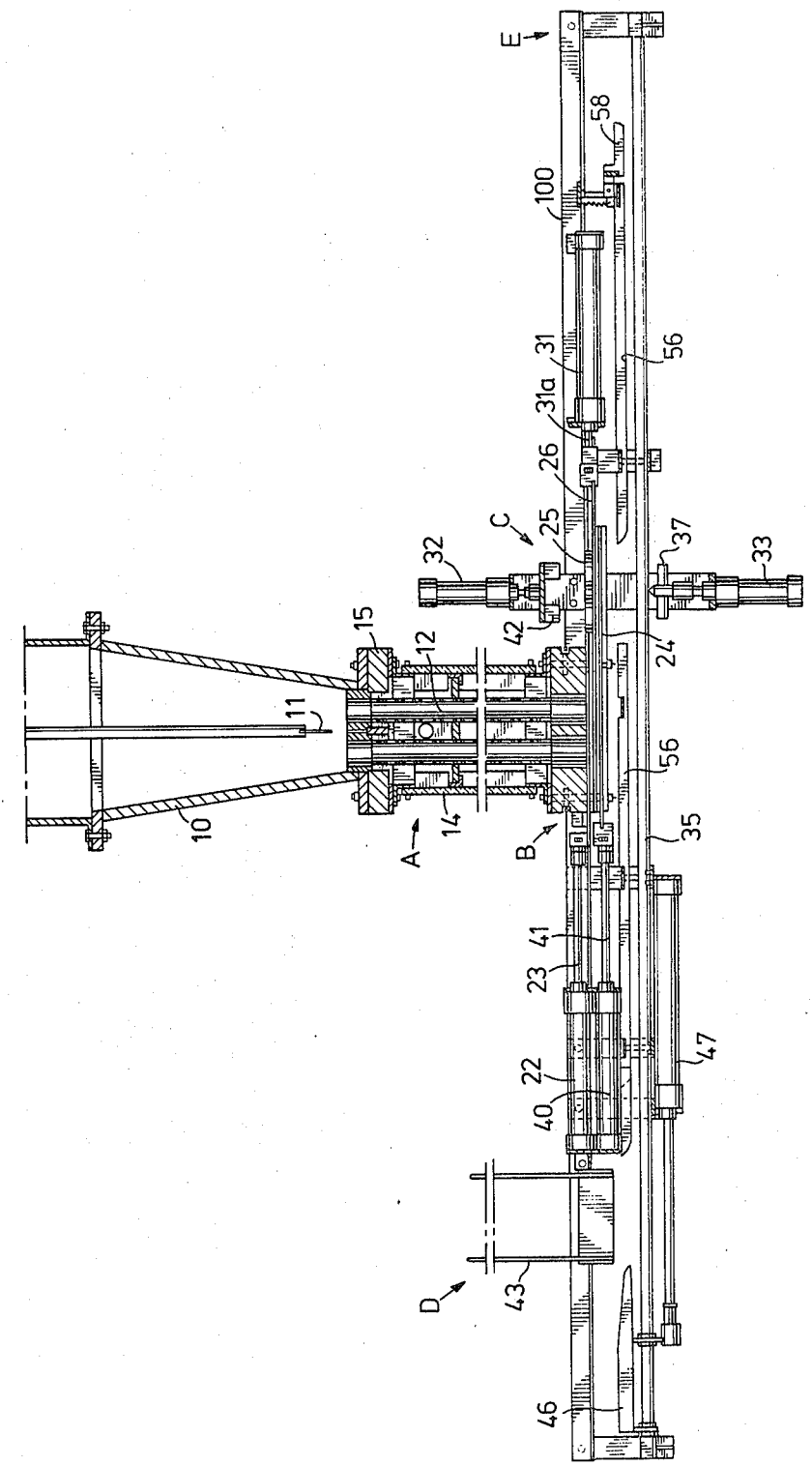
FIG. 1 represents, in longitudinal section along line I—I, in FIG. 2, a device according to the invention.

The apparatus according to the invention makes it possible to mold portions of curd in a desired shaped with the view to the preparation, from the latter, of small-sized cheeses. As shown in FIG. 1, the apparatus comprises, a formation of station A, mounted in a fixed position, on a frame 100. In the formation station A, the curd agglomerates and is separated from the whey. A slicing station B mounted on frame 100 where the agglomerated curd is sliced into portions of suitable size. A transfer station C is where the portions of curd are placed in molds passing from a distribution station D. The molds filled with curd are removed to an outlet region E.

Figure 2:
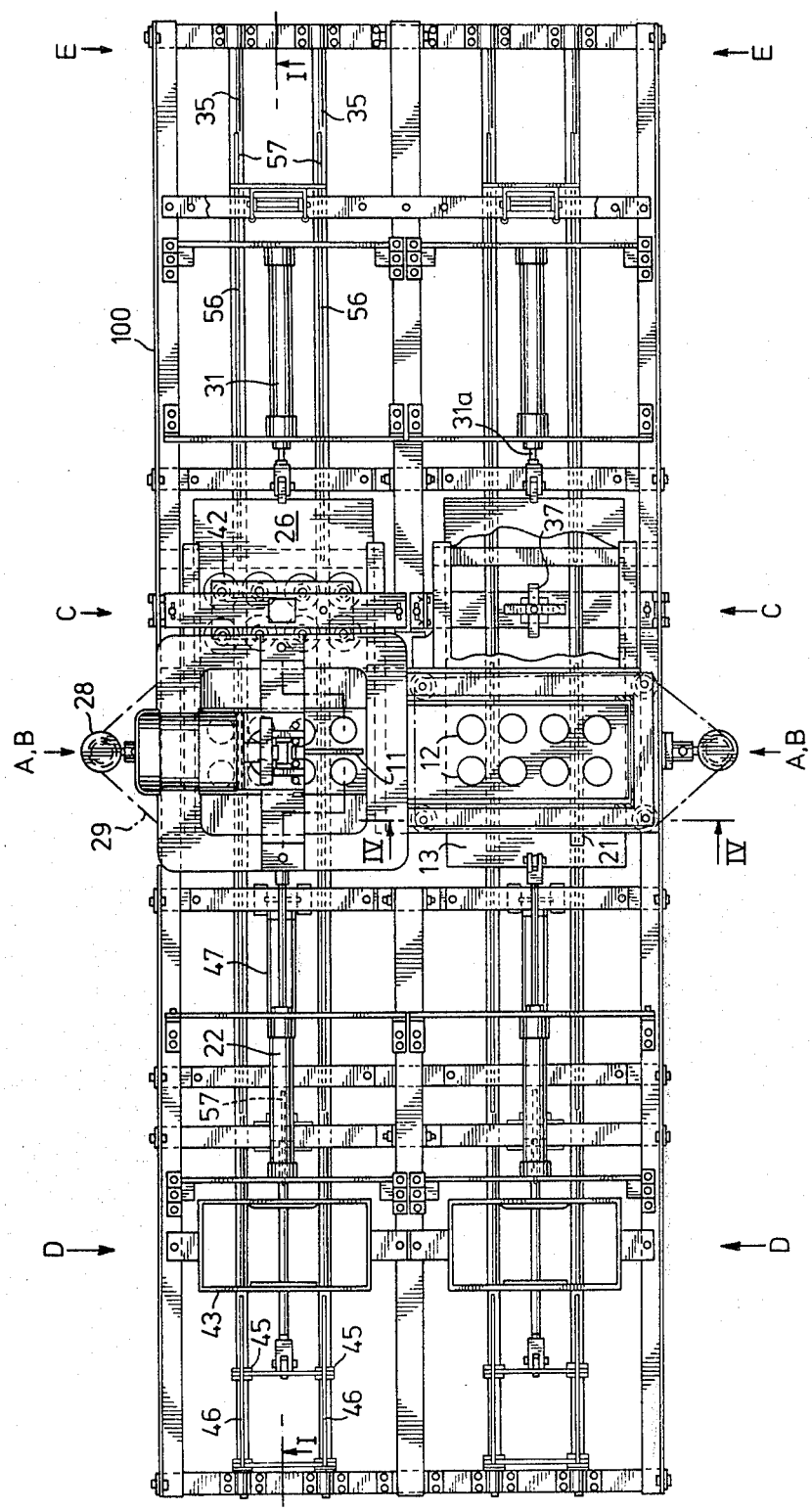
FIG. 2 represents in plan, a pair of devices according to the invention coupled side by side.
Figure 3:
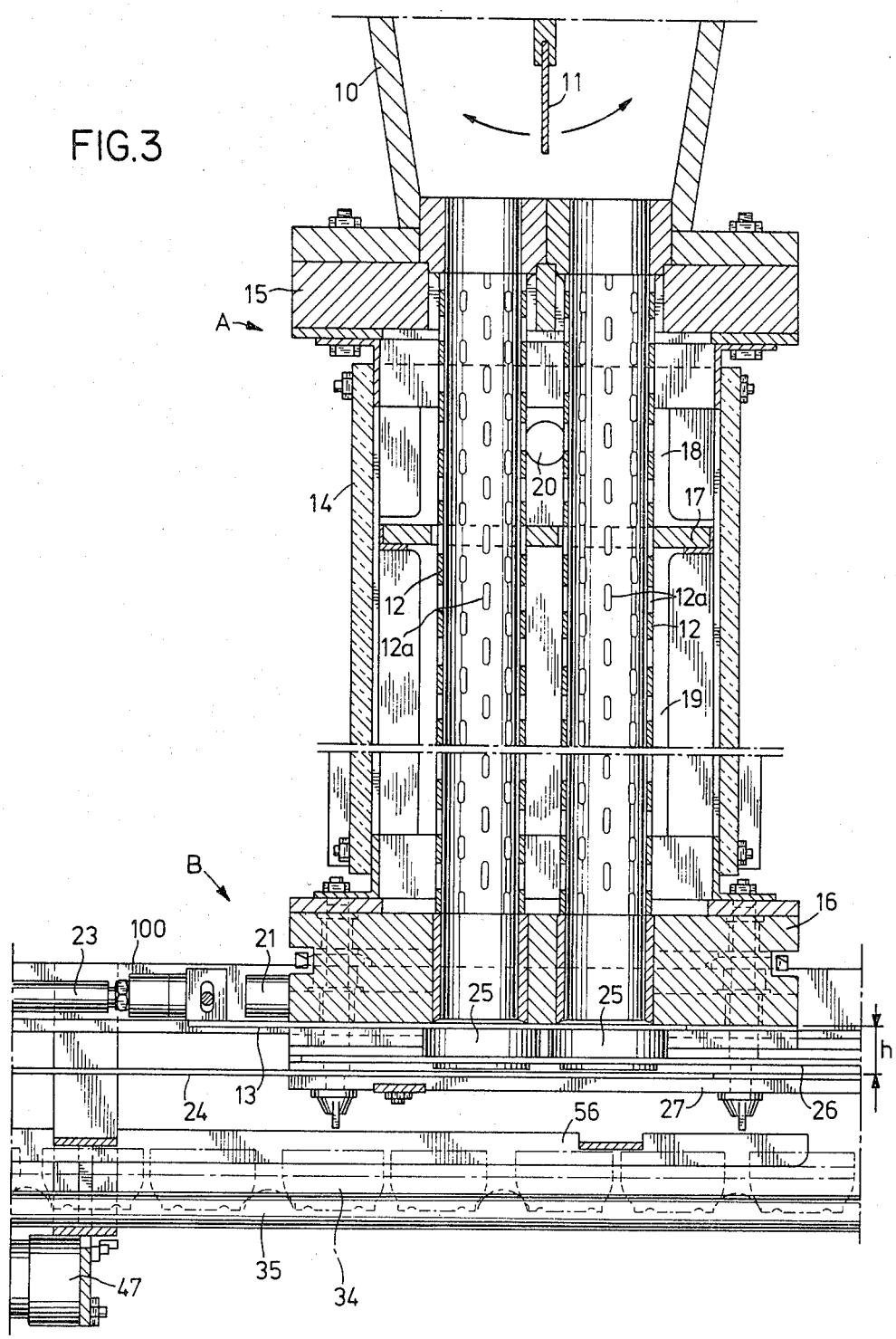
FIG. 3 represents, on a larger scale, the central part of the device in FIG. 1, comprising, in superposition, the curd formation station and the curd slicing station, the movable plates of this latter station being in another position.

At the top of station A (FIGS. 1 and 3) there is a hopper 10 which receives a mixture of curds and whey. The hopper is stirred by an agitator 11, and the level of curds and whey is kept constant. The base of hopper 10 is in open communication with a certain number of fixed vertical tubes 12 in the form of a cylinder of revolution. The figures illustrate a group of eight tubes distributed in two rows of four in the present example (FIG. 2).

The mixture of curds and whey accumulates and decants in the tube. These tubes are provided with oblong perforations 12a disposed in a staggered pattern and oriented vertically. The whey flows through the perforation, while the curd agglomerates in tubes 12 by gravity in compact, columnar masses resting on a horizontal plate 13 which closes off the lower outlet of tubes 12. The set of eight tubes 12 is enclosed in a leakproof enclosure formed of a transparent jacket 14 and two flanges 15 and 16, are provided with eight openings for passage of the tubes 12. The upper flange 15 is connected to hopper 10, and the lower flange 16 is fixed to frame 100. The space inside jacket 14 is divided by a partition 17 into an upper part 18 where a strong flow of whey takes place. The partition forms a barrier, which prevents the whey from flowing along tubes 12. The whey is removed through a nozzle 20. In the lower part 19, the remaining fraction of the whey flows off and is removed by a nozzle 21. In this way, eight columns of curds are obtained. At the base of the columns, the curd is compact and almost completely free of the whey which initially accompanied it.

Plate 13 is mobile and can be displaced horizontally under the influence of a horizontal jack 22, whose shaft 23 is attached to the plate. When this jack is actuated, plate 13 slides to the left in the representation in the figures, and opens the lower ends of tubes 12. The eight columns of curd then drop abruptly by a height h (FIG. 3), limited by a second horizontal plate 24 subjacent to plate 13. The eight columns of curd pass through the eight rings 25 borne by a third plate 26, situated between the first two. The rings pass through plate 26 by means of corresponding openings. Then, as jack 22 returns plate 13 to its original position, the latter then plays the part of a guillotine and slices the bottom part of the eight columns of curd, so that eight circular slices of curd are obtained equal in diameter to the diameter of tubes 12 (on the order of 40 mm), and equal in thickness to the height of fall h of the columns of curd (on the order of 20 mm), these calibrated slices being lodged inside rings 25.

The height h is preferably adjustable, so that it can be adjusted as a function of the thickness desired for the cheeses to be made from the portions of curd. For this purpose, as shown FIG. 4, the lower plate 24 (as well as intermediate plate 26) is guided in a slide 27, adjustable in level by means of control knob 28, that actuates, through a chain transmission 29, a masterscrew and nut mechanism. By way of example, in the left-hand part of FIG. 4, a slide 27' is shown, adjusted to a level lower than that of slide 27 on the right-hand side. Plate 13, for its part, always remains at the same level and is guided against the lower face of flange 16 by a fixed slide 30.

Figure 6:
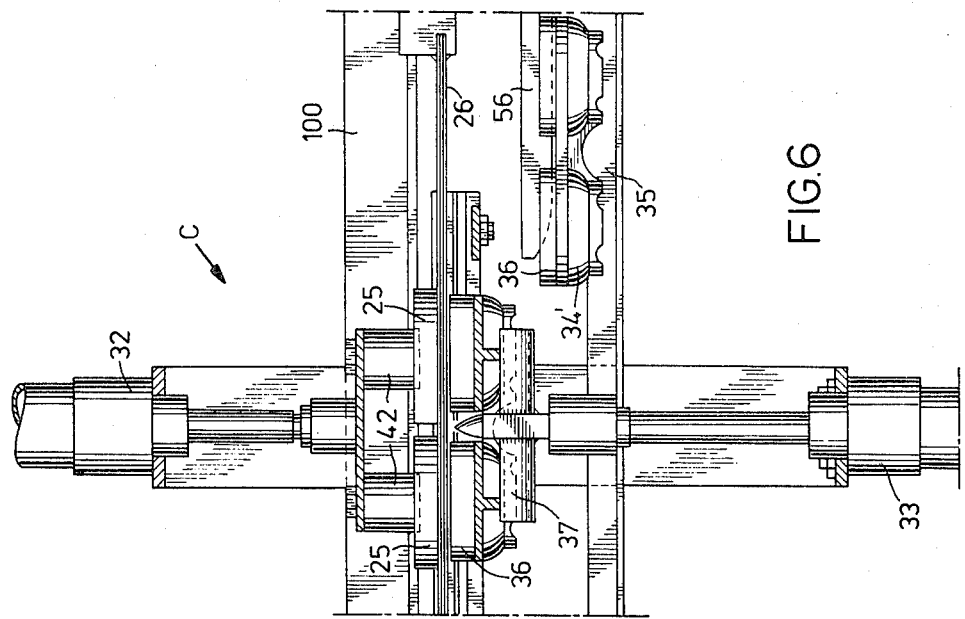
FIGS. 5 and 6 represent, in the manner of FIG. 1, but on the scale of FIGS. 3 and 4, the transfer station situated below the stations of formation and slicing of the curd, respectively in two operating positions.

The intermediate plate 26 and its rings 25 filled with calibrated portions of curd, are, in turn, displaced slidingly, by the shaft 31a of a jack 31 which is likewise horizontal. The rings 25 stop in transfer station C (the position represented in FIG. 1) vertically in line with a pair of vertical jacks 32, 33, situated, respectively, above and below plates 26 and 24. The latter plate accompanies plate 26 in its translation of movement under the influence of a jack 40, and the shaft 41 to which it is connected. Vertically in alignment with jacks 32, 33, a mold 34 (FIG. 5) is also present, borne by fixed rails 35. The mold has eight cells 36 facing the eight rings 25. Lower jack 33 is activated and raises a support, comprising a carrying crosspiece 37 which engages in the intervals between cells 36, and a centering finger 38, that penetrates into a central hole 39 in mold 34, thereby lifting the mold, which moves its cells 36 against the lower face of plate 24. The latter retracts to the left (coming into the position represented in FIG. 3), under the influence of jack 40, so that cells 36 fit on the lower edge of rings 25 (FIG. 6). Jack 32 is then activated and causes eight plungers 42 to move downward, forcing the eight portions of curd down from rings 25 into the cells 36 of mold 34, where they assume the precise desired form.

Then jacks 32 and 33 retract, so that mold 34, filled with curd, drops back onto rails 35. The filled mold then slides to the right (position 34' in FIG. 6) and moves into the ejection zone E of the apparatus, while plate 24 returns to idle position and plate 26 returns under tubes 12. The cycle described is then repeated in identical fashion.

Molds 34 necessary to the successive cycles of molding of the curd portions,are supplied by distribution station D positioned on the left-hand side of the apparatus. The latter comprises a fixed bottomless feed housing 43 which surmounts the rails 35, and in which are stacked a certain number of molds 34 (FIG. 7). The bottom mold 34a rests on rails 35 which extend rectilinearly over the entire length of the apparatus between station D and removal region E for the molds loaded with curd (FIG. 1). Sliders 44, 45, bearing a pair of pointed blade 46 or "skis" can slide on these rails under the influence of a jack 47 placed horizontally under the rails 35. When jack 47 causes its shaft 48 (FIG. 8) to retract, the skis 46, whose forward point 49 lies at an appropriate height above rails 35, penetrate between the lower mold 34a and the mold situated immediately above it. The skis pass between the cells of the mold 34 and above the sheet 50 of this mold. Sheet 50 is a sheet belonging to each mold 34 and uniting its cells 36. The skis cause no displacement of mold 34a; and, witn their forward, ramplike part 52, lift and then with their horizontal rear part 53, sustain the molds stacked in housing 43, in such a way as to detach, from the eight cells of mold 34a, the corresponding eight lower collars 51 of the immediately superjacent mold. The forward sliders 45 meet the mold 34a, released from the grasp of the other molds, and slide in it to the right, by an amount slightly greater than the width 1 of the molds 34, along rails 35. This movement produces a displacement exactly equal in amplitude to 1 of mold 30, disposed on the rails 35 in the preceding cycle, and of the entire series of molds 34 (represented in broken lines in FIG. 3) already deposited, side by side, covering the rails 35 as far as the removal zone E where the molds are ejected from the device. Jack 47 then brings skis 46 back into their original position (FIG. 7), the stack of molds 34 falls by gravity onto rails 35 where the next mold is then available to be isolated from the molds surmounting it, by means of skis 46, and pushed to the right by sliders 45.

Figure 5:
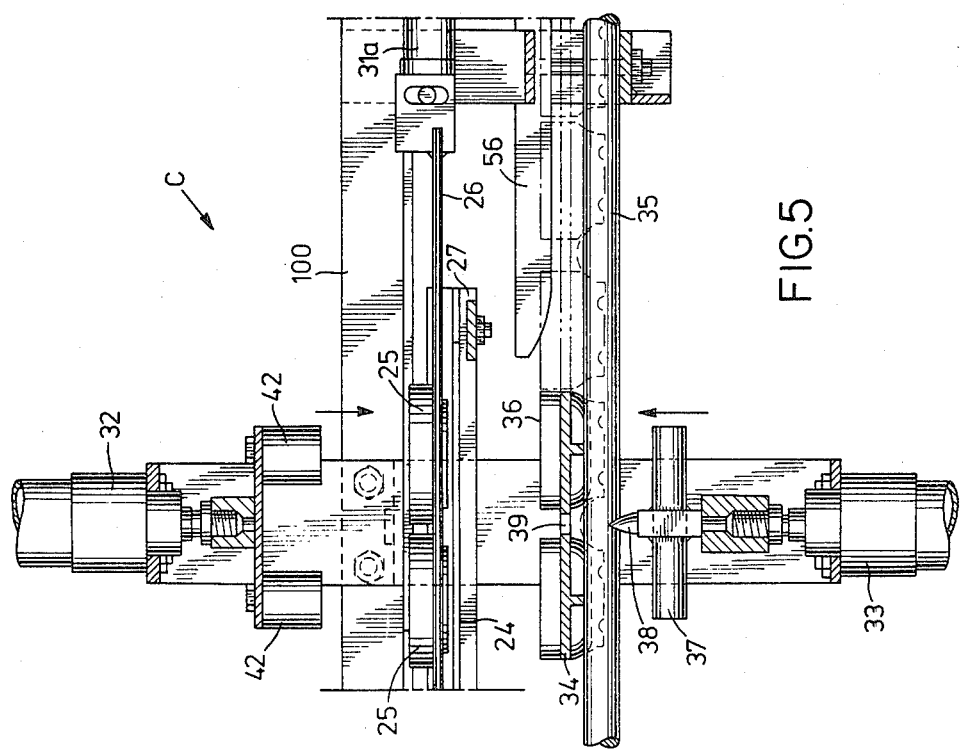

The relative position of distribution station D and transfer station C along rails 35 is chosen in such a manner that, with each idle phase of the series of molds 34, a mold will stop in vertical alignment with jacks 32, 33, and rings 25 containing the slices of curd. The solid plate 36 is also stopped in a suitable position at this moment. The mold can be correctly taken over by the lifting elements 37, 38 or jack 33, and can receive, the eight slices of curd in its eight cells 36, as illustrated by FIGS. 5 and 6. More generally, the displacement of the various moving parts of the device (plates 13, 24, 26 and skis 46 solid with sliders 44, 45) are carried out in mutual synchronism by coordinated control of their respective actuation jacks 22, 40, 31 and 47, the respective strokes of the shafts of these jacks being adjusted to obtain the working described.

The conformation of the molds 34 with eight cells appears in particular in FIGS. 4 to 8. The eight cells 36 disposed in a configuration in two rows of four corresponding to that of the eight tubes 12 and the eight rings 25, are connected by the plane, rectangular sheet 50, practically at half height. Each is provided at the base with collar 51 which permits the mutual fitting of molds 34 in superposition. Sheet 50 is pierced in its center with hole 59 for centering finger 38 (FIGS. 5 and 6). The cells 36 in a given row, are connected, under sheet 50, by small partitions 54, 55, each presenting a semi-circular indentation. Molds 34 repose on, and are guided by rails 35 by means of the indentations in partitions 54, which match the profile thereof. The indentations in the median partitions 55 cooperate in transfer station C with the arm, parallel to rails 35, of crosspiece 37 on jack 33. Each mold 34 is molded in one piece of plastic.

Figure 4:
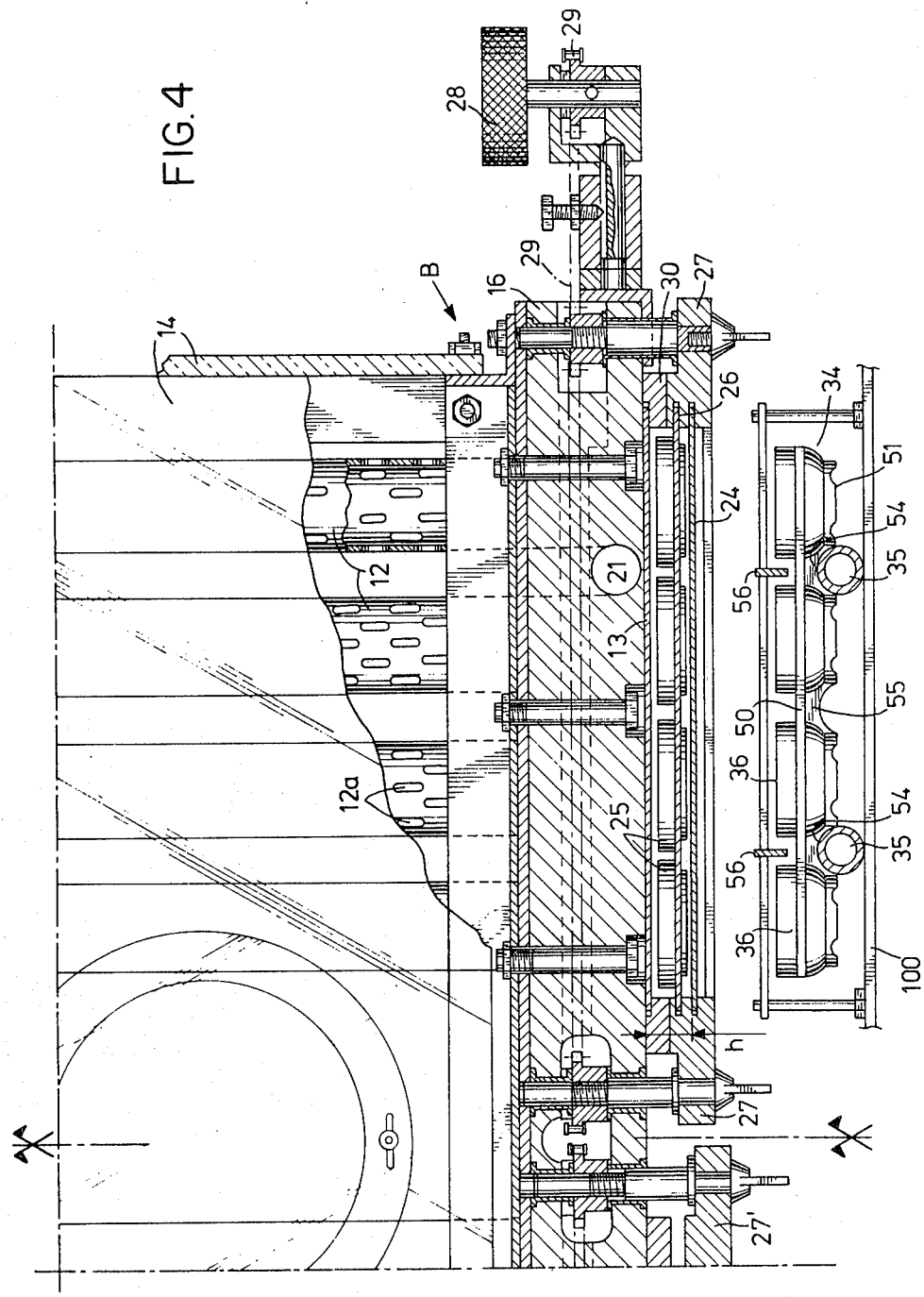
FIG. 4 represents, on the scale of FIG. 3, the central part of the device, seen along sectional line IV—IV in FIG. 2.

As they advance along rails 35, the molds 34 are also guided by counter-rails 56 situated above rails 35 and passing between cells 36, as shown in FIG. 4. These counter-rails prevent any accidental lifting of the molds 34 as they advance, and force them to remain contiguous. They are naturally broken at the position of transfer station C (FIG. 1) to permit the successive rise of molds 34. In order not to hamper the displacements of the skis, situated above rails 35, a portion of the counter-rails 56 is eliminated at the corresponding end, and replaced by a short, central counter-rail 57. At the outlet side for the loaded molds, the counter-rails 56 terminate in braking elements 58 which keep the molds 34 in juxtaposition on the rails 35.

What is claimed is:

1. An apparatus for intermittently forming multiple discrete portions of curd which comprises: means for forming columns of curds by continuous agglomeration and expulsion of whey from a plurality of vertical perforated tubes having an inlet and outlet; a hopper means for feeding a mixture of curds and whey into the inlet of each tube; curd slicing means comprising a horizontal plate in communication with the outlet of each tube which closes off the outlet, said horizontal plate being retractably mounted intermittently to permit the column of curd in each tube to drop abruptly by a predetermined height onto a subjacent stop member, and to slice the corresponding portion of curd between the outlet of the tube and the stop member; and mobile rings between said plate and said stop member through which the lower portions of columns of curd respectively drop said rings adapted to move multiple slices of curd to a transfer station aligned with the molds and means for transferring the lices to the molds.

2. The apparatus of claim 1, wherein the means for transferring the slices to the molds are plunger means.

3. The apparatus of claim 1, wherein the slicing means comprises three superposed, horizontal plates, each one animated with a proper alternating translation movement in its own plane; a first plate adapted intermittently to close the outlet of each tube, to retract and to return to cut the portion of curd than emerging from the tube and resting on a second retractable plate, constituting a stop member, a third plate having open rings, through which the curd emerging from the tube passes movably positioned between the first and second plate, said second and third plates adapted to transport the slices of curd to the transfer station, where the second plate retracts, permitting the transfer of the slices from the rings into the molds.

4. The apparatus of claim 1 in which each perforated tube is surrounded by a leakproof enclosure whose interior is divided into two parts by a horizontal partition, the enclosure being provided in each of these parts with a whey evacuation nozzle.

5. The apparatus of claim 1 having guide rails passing through the transfer station, means for advancing a series of integrated multiple molds, each integrated mold having multiple molding portions for molding multiple slices of curd, step-by-step into vertical alignment with curd-filled rings in the transfer station, means for lifting the integrated multiple mold from the rails to below the rings, and returning the integrated multiple mold to the rails where it again participates in the step-by-step advancement of the series of integrated multiple molds.

6. The apparatus of claim 5, wherein a distribution station for integrated multiple molds comprises a pair of pointed blades animated with an alternating movement parallel to the rails, said blades adapted to be introduced between the lower mold, resting on the rails, of a stack of molds in a housing, adapted to hold the stack of molds while releasing the lower mold, sliders, solid with the said blades, which push the released lower mold toward the transfer station, and with it, all the molds already placed in succession on the rails, the blades and the sliders alternately returning to their original position, so that the stack of molds falls back onto the rails.

* * * * *